United States Patent
Halstead

(10) Patent No.: US 6,422,606 B1
(45) Date of Patent: Jul. 23, 2002

(54) FLUID CONDUCTING CONNECTOR ASSEMBLY

(75) Inventor: Mark Halstead, Berkley, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 09/501,483

(22) Filed: Feb. 9, 2000

Related U.S. Application Data

(60) Provisional application No. 60/122,639, filed on Mar. 3, 1999.

(51) Int. Cl.[7] ............................................. F16L 19/02
(52) U.S. Cl. ........................................................ 285/52
(58) Field of Search ...................... 285/226, 52, 334.1, 285/334.3

(56) References Cited

U.S. PATENT DOCUMENTS

| | | | |
|---|---|---|---|
| 697,368 A | 4/1902 | Shaw | |
| 1,726,808 A | * 9/1929 | Cox | .............. 285/334.1 X |
| 2,486,936 A | 11/1949 | Fergus | |
| 2,669,465 A | 2/1954 | Newell | |
| 2,726,101 A | 12/1955 | Peterson | |
| 2,740,757 A | 4/1956 | Craver | |
| 2,748,250 A | 5/1956 | Andrus | |
| 2,794,658 A | 6/1957 | Purkhiser | |
| 3,108,826 A | 10/1963 | Black | |
| 3,167,333 A | 1/1965 | Hall et al. | |
| 3,192,612 A | 7/1965 | Elliott et al. | |
| 3,218,096 A | 11/1965 | Press | |
| 3,338,597 A | 8/1967 | Mason | |
| 3,346,274 A | * 10/1967 | Baron | ......................... 285/52 |
| 3,408,093 A | * 10/1968 | Epstein | ........................ 285/52 |
| 3,434,744 A | * 3/1969 | Yoke et al. | ................... 285/52 |
| 3,501,171 A | * 3/1970 | Baron | ......................... 285/52 |
| 3,542,663 A | 11/1970 | Alewitz | |
| 3,552,427 A | 1/1971 | Jacobson | |
| 3,596,931 A | 8/1971 | Mishier et al. | |
| 3,596,933 A | 8/1971 | Luckenbill | |
| 3,600,009 A | * 8/1971 | Shupper | ..................... 285/52 |
| 3,614,137 A | 10/1971 | Jacobson | |
| 3,660,264 A | 5/1972 | Schuller | |
| 3,718,571 A | 2/1973 | Bidwell | |
| 3,718,573 A | 2/1973 | Bidwell | |
| 3,726,548 A | 4/1973 | Alewitz | |
| 3,753,888 A | 8/1973 | Alewitz | |
| 3,764,169 A | * 10/1973 | St. Clair | ...................... 285/52 |
| 3,811,710 A | 5/1974 | Dula | |
| 3,863,963 A | 2/1975 | Hershey | |
| 3,867,274 A | 2/1975 | Herman | |
| 3,891,530 A | 6/1975 | Alewitz | |
| 4,060,472 A | 11/1977 | Alewitz | |
| 4,083,583 A | 4/1978 | Volgstadt et al. | |
| 4,162,801 A | * 7/1979 | Kresky et al. | .......... 285/226 X |
| 4,216,793 A | 8/1980 | Volgstadt et al. | |
| 4,229,025 A | 10/1980 | Volgstadt et al. | |
| 4,282,175 A | 8/1981 | Volgstadt et al. | |
| 4,407,526 A | 10/1983 | Cincenas | |
| 4,487,432 A | 12/1984 | Passerell et al. | |
| 4,628,965 A | 12/1986 | Passerell | |
| 5,169,180 A | 12/1992 | Villoni et al. | |
| 5,308,122 A | * 5/1994 | Crawford et al. | ......... 285/52 X |

FOREIGN PATENT DOCUMENTS

JP 5346190 * 12/1993

* cited by examiner

Primary Examiner—Lynne H. Browne
Assistant Examiner—David E. Bochna
(74) Attorney, Agent, or Firm—Edgar A Zarins; Lloyd D. Doigan

(57) ABSTRACT

A fluid conducting connector for use in water connections particularly water heater connectors. The connector assembly is designed for mating connection to a galvanized nipple for reduction of galvanic corrosion between dissimilar metal connections. An insulator assembly is seated within the connector to maintain separation between the galvanized nipple and the copper tube of the assembly. The connector assembly includes an internally threaded female connector mounted to the copper tube for connection to the nipple. The insulator assembly includes a tubular sleeve and a sealing washer. The sleeve extends partially into the copper tube while the washer seats within the female connector to seal the connector.

14 Claims, 2 Drawing Sheets

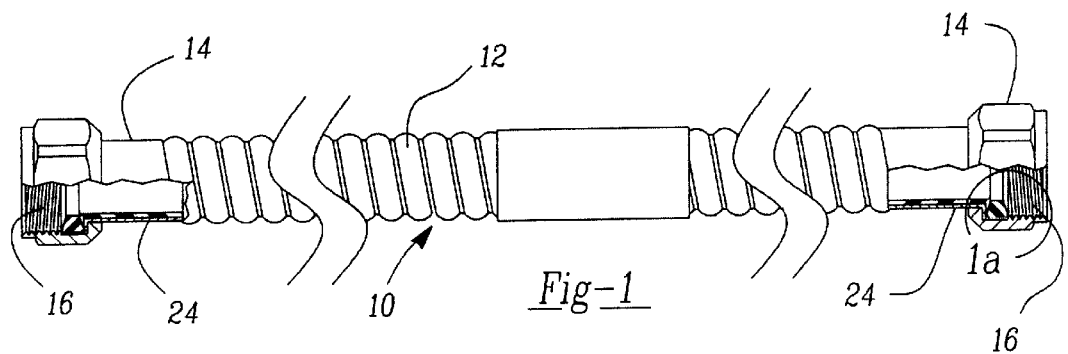
Fig-1
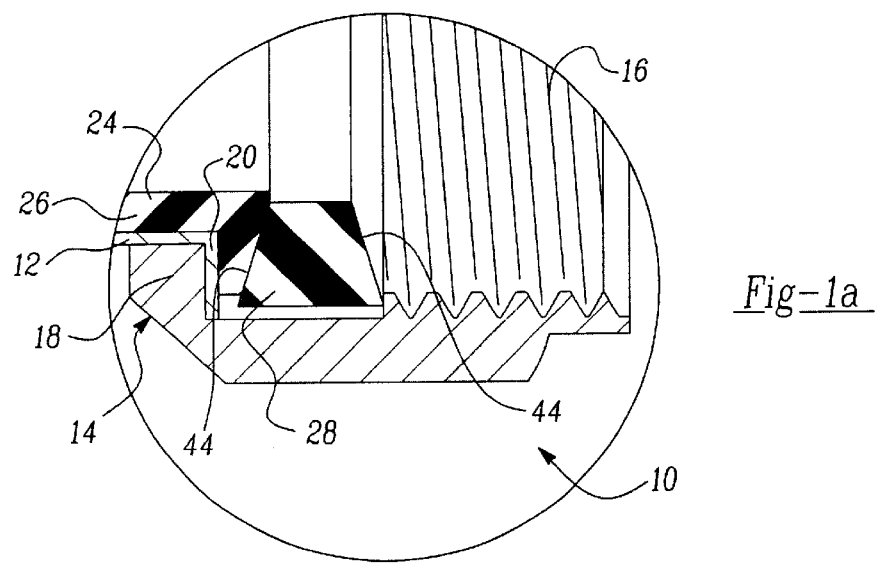
Fig-1a
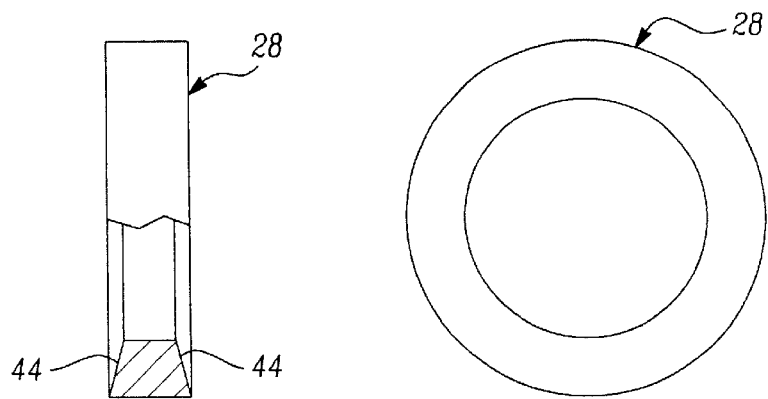
Fig-2a          Fig-2b

FLUID CONDUCTING CONNECTOR ASSEMBLY

RELATED APPLICATION

This application claims priority from U.S. Provisional Application No. 60/122,639 filed on Mar. 3, 1999.

BACKGROUND OF THE INVENTION

I. Field of the Invention

This invention relates to fluid conductors and, in particular, to a fluid conductor connector assembly which incorporates a dielectric insulator assembly within the female connector to reduce corrosion between dissimilar metal connections.

II. Description of the Prior Art

Connectors for fluid systems such as hot water heaters often incorporate components made of dissimilar metals. One example is the copper tubing used in many connector assemblies and a galvanized male nipple. As water flows across these components an electric current on the order of 1–2 milliamps is created depending upon the temperature and condition of the water. This galvanic action causes corrosion which can deteriorate the connector assembly and clog flow paths through the water system.

Various modifications have been made to such water systems in an attempt to reduce or eliminate galvanic corrosion. Since such corrosion results from the use of dissimilar metal components the most obvious alternative is to utilize similar materials throughout the system. However, this may not always be practical particularly when parts are added to or replaced in the existing system. Alternatively, since the corrosion is a result of the electric current flowing across the dissimilar metal components, insulators have been incorporated in the galvanized male connector or nipple which prevents contact with the tubing connected thereto. Such insulators are in the form of a sleeve with a radial flange. The sleeve portion extends into the flow passageway of the nipple while the flange sits at the opening to prevent full insertion. In the prior known sleeves the flange extends beyond the periphery of the nipple in order to create a sealing engagement between the threads of the connectors. One prior known sleeve includes a secondary flange beyond the first flange which is deformably crimped between the threads upon connection. These insulator sleeves incorporated into such male connectors provide sufficient isolation to reduce galvanic corrosion. However, the sleeves have a tendency to fall out of the connector since they are dependent upon a friction fit with the interior wall of the connector. As a result, the sleeves were made longer than necessary or incorporated crimping means to maintain their position within the connector. Moreover, it has been found that in most cases it is the tubing connector which is replaced. If the galvanized nipple has not been previously provided with an insulator sleeve because identical materials were being used, replacement of the connector can cause galvanic corrosion.

The one-piece dielectric insulator sleeve disclosed in U.S. Pat. No. 5,169,180 was expected to provide a compromise of structural properties to prevent galvanic corrosion. The flange portion was intended to be soft enough to act as a seal while the tubular body needed to be stiff enough to stay tight against the wall of the connector hose and out of the flow path of the water. However, this construction compromised the operation of the sleeve.

SUMMARY OF THE PRESENT INVENTION

The present invention overcomes the disadvantages of the prior known fluid connector assemblies by providing a connector with an insulator assembly incorporated into the female connector which reduces corrosion while also acting as a sealing washer for the connection.

The fluid conducting connector assembly according to the present invention includes a tubular conductor or pipe and at least one internally threaded female connector attached to the end of the tubing. Typically, the connector is of the swivel type which allows rotation for connection without rotating the tubing. The female connector is adapted to threadably engage a male nipple upon assembly of the fluid system.

In order to reduce corrosion, an insulator is incorporated into the end of the fluid conducting connector. The insulator assembly generally includes a dielectric sleeve which extends partially into the connector hose and a sealing washer engaging the sleeve. The sleeve has a tubular body closely matching the inner diameter of the connector hose in order to dielectrically separate the connection. An outer end of the sleeve has an outwardly disposed peripheral flange. Preferably, the flange has a conical or frusto-conical cross-sectional configuration in order to sealingly cooperate with the washer. The washer may have a conventional rectangular cross-sectional configuration or a frusto-conical cross-sectional configuration in order to cooperate with the peripheral flange of the sleeve and sealingly engage the female connector to prevent fluid leakage. Upon insertion of both components, the sealing washer will capture the insulator flange against a shoulder of the connector thereby maintaining the sleeve with the connector. In order to optimize the properties of both components, the washer is preferably made of synthetic rubber which has improved sealing properties and the sleeve is preferably made of a glass filled polypropylene.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which:

FIG. 1 is a partial cross-sectional view of a fluid conducting connector assembly embodying the present invention;

FIG. 2 is an illustration of the sealing washer; and

DETAILED DESCRIPTION OF A PREFERRED EMBODIMENT OF THE PRESENT INVENTION

Figure 3A:
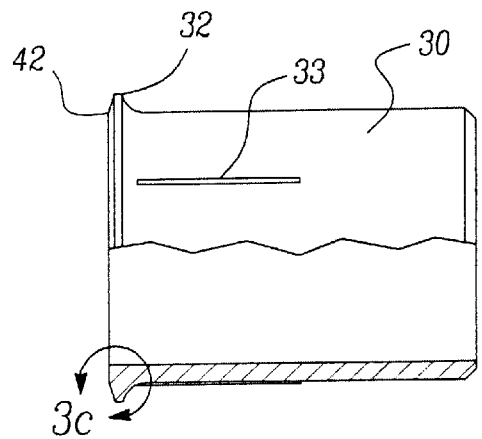
FIG. 3 is an illustration of the insulator sleeve.
Figure 3B:
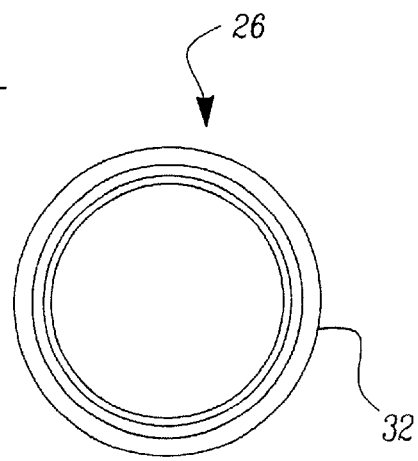
Figure 3C:
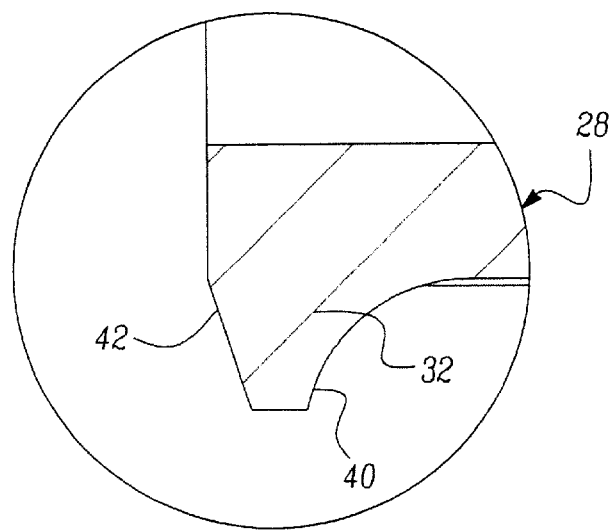
Figure 4:
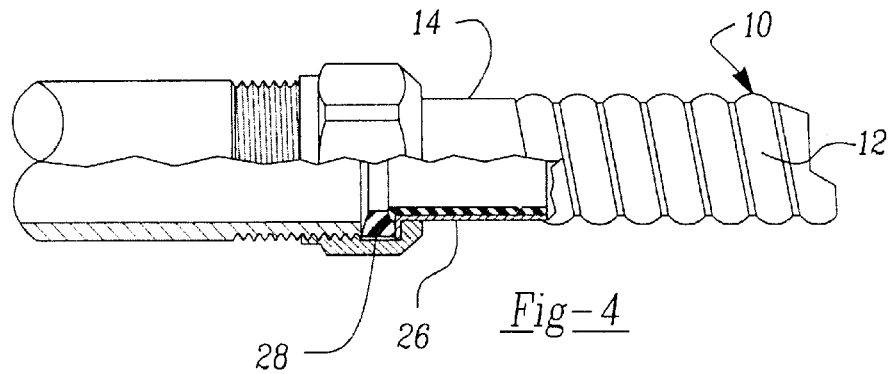
FIG. 4 is a partial cross-sectional view of the fluid conducting connector secured to a mating conductor.

Referring first to FIG. 1, there is shown a fluid conducting connector 10 embodying the present invention. The connector 10 is adapted to be used in water connections such as connectors for water heaters. The connector 10 generally includes a flexible tube 12 and end connectors 14. The embodiment depicted in the drawings includes a pair of internally threaded female connectors 14 rotatably attached to the flexible tube 12. The conductor tubing 12 is a corrugated tubing for flexibility of installation preferably made of copper.

The end connectors 14 are of the female type with internal threads 16 formed on the cylindrical side wall. A terminal end wall 18 cooperates with a flange 20 on the tubing 12 to maintain the connectors 14 on the tubing 12. The female connectors 14 are adapted to receive a threaded male nipple for connection to the water system. Alternatively, various forms of end connectors may be employed on the fluid conductor 10.

In order to reduce the corrosion resulting from conduction between the dissimilar metals of the tubing 12 and the male nipple to which the assembly 10 is attached while also preventing fluid leakage, an insulator assembly 24 is inserted within the tubing 12 and connector 14. The insulator assembly 24 consists of a tubular sleeve 26 to prevent dielectric corrosion and a soft sealing washer 28 to prevent fluid leakage.

The tubular sleeve 26 includes a tubular body 30 which closely conforms to the inner diameter of the tubing 12 in order to be snugly received therein. Formed on the outer end of the tubular body 30 is an outwardly disposed radial flange 32. In the preferred embodiment, the radial flange 32 has a triangular or frusto-triangular cross-sectional configuration. The tubular sleeve 26 is formed of a relatively stiff material such as glass filled polypropylene. Longitudinal ribs 33 may be provided on the outer surface to form a sung fit with the tubing 12.

The sealing washer 28 is a ring to allow fluid flow therethrough. The washer 28 may have a rectangular cross-sectional configuration but preferably has a rhomboid cross-sectional configuration in order to better cooperate with the radial flange 32 of the sleeve 26. The washer 28 is made of a relatively softer material such as nitrile in order to form a sealing connection.

Upon insertion of the insulator assembly 24 into the connector 10, the tubular body 30 will extend into the tubing 12 and the radial flange 32 engage the flange 20 of the tubing 12. Thereafter, the washer 28 is inserted against the flange end of the sleeve 26 thereby capturing the radial flange 32 against the interior of the connector 14. The washer 28 and sleeve 26 are configured to nestingly engage within the connector 10 to both prevent fluid leakage and reduce galvanic corrosion. The frusto-conical flange 32 of the sleeve 26 includes a tapered trailing edge 40 which cooperates with the flange 20 of the tubular body 12 and an angled forward edge 42. The angled forward edge 42 of the sleeve 26 is designed to nestingly cooperate with the rhomboid configuration of the washer 28. The faces 44 of the washer 28 slope outwardly such that the outer edge of the washer 28 is thicker than the radial inner edge. This angled face 44 is conducive to nesting engagement with the forward edge 42 of the sleeve 26 ensuring dielectric insulation while preventing fluid leakage.

The sleeve 26 and washer 28 may be manufactured of identical materials or two different materials. In one embodiment of the invention, the washer 28 may be made of a softer material for improved sealing while the sleeve 26 is made of a more rigid material to facilitate insertion within the tube 12 and for improved dielectric insulation. One example includes manufacturing the washer 28 of a synthetic rubber or nitrile material and the sleeve 26 of a glass filled polypropylene. The utilization of a separate washer and sleeve ensures that the sleeve 26 will provide dielectric insulation while the washer 28 provides fluid sealing not only with the flange 32 of the sleeve 26 but also with the tube flange 20 and the mating nipple upon connection of the conductor.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fluid conducting connector assembly comprising:

a tubular conductor;

an internally threaded female connector attached to at least one end of said conductor; and an insulator assembly having a tubular sleeve with an integrally formed radial flange extending outwardly from said tubular sleeve and a sealing washer, said assembly received in said conductor and connector such that said sleeve extends at least partially into the interior of said tubular conductor and said sealing washer seats within said female connector to seal against an outer edge of said radial flange of said tubular sleeve and a radial flange of said tubular conductor.

2. The connector assembly as defined in claim 1 wherein said radial flange of said tubular conductor is seated within said connector, said sealing washer sealingly engaging said radial flange of said tubular sleeve and said radial flange of said tubular conductor.

3. The connector assembly as defined in claim 2 wherein said sealing washer has a substantially rhomboid cross-sectional configuration with an outer peripheral edge substantially thicker than an inner radial edge of said washer forming a sloped face.

4. The connector assembly as defined in claim 3 wherein said radial flange of said insulator sleeve includes a forward edge, said forward edge angled to form a radial flange tapered outwardly, said forward edge of said sleeve cooperation with said face of said washer to nestingly seat said washer against said insulator sleeve within said connector assembly.

5. The connector assembly as defined in claim 4 wherein said washer is made of a material softer than said insulator sleeve.

6. The connector assembly as defined in claim 5 wherein said washer is made of a substantially soft sealing material.

7. The connector assembly as defined in claim 4 wherein said insulator sleeve includes a plurality of longitudinal ribs formed on an exterior surface of said sleeve.

8. A fluid conducting connector assembly comprising:

a tubular conductor having a radial end flange;

an internally threaded female connector attached to at least one end of said conductor, said radial end flange seating within said connector; and an insulator assembly consisting of a tubular sleeve disposed within said conductor with an integrally formed radial flange seating against said radial end flange of said tubular conductor within said connector and a sealing washer seated within said connector to sealingly engage said radial flange of said insulator sleeve and said radial end flange of said tubular conductor.

9. The connector assembly as defined in claim 8 wherein said washer and said radial flange have a tapered cross-sectional configuration for nesting engagement.

10. The connector assembly as defined in claim 9 wherein said sealing washer has a substantially rhomboid cross-sectional configuration with an outer peripheral edge substantially thicker than an inner radial edge of said washer forming a sloped face.

11. The connector assembly as defined in claim 10 wherein said radial flange of said insulator sleeve includes a forward edge, said forward edge angled to form a radial flange tapered outwardly, said forward edge of said sleeve cooperation with said face of said washer to nestingly seat said washer against said insulator sleeve within said connector assembly.

12. The connector assembly as defined in claim 11 wherein said washer is made of a material softer than said insulator sleeve.

13. The connector assembly as defined in claim 12 wherein said washer is made of a substantially soft sealing material.

14. The connector assembly as defined in claim 12 wherein said insulator sleeve includes a plurality of longitudinal ribs formed on an exterior surface of said sleeve.

* * * * *